United States Patent [19]

Pipes

[11] 4,016,984
[45] Apr. 12, 1977

[54] SHUTTLE ASSEMBLY FOR A LOAD HANDLING APPARATUS

[75] Inventor: George R. Pipes, Salt Lake City, Utah

[73] Assignee: Eaton Corporation, Cleveland, Ohio

[22] Filed: Aug. 28, 1975

[21] Appl. No.: 608,412

[52] U.S. Cl. .............................. 214/1 BB; 214/730
[51] Int. Cl.² ........................................ B65G 65/02
[58] Field of Search ............ 214/1 B, 1 BB, 16.4 A, 214/16.4 B, 730

[56] References Cited

UNITED STATES PATENTS

| | | | |
|---|---|---|---|
| 3,596,789 | 8/1971 | Aaronson et al. | 214/730 |
| 3,620,381 | 11/1971 | McCaughey | 214/1 BB |
| 3,756,433 | 9/1973 | Richins | 214/16.4 A |
| 3,934,732 | 1/1976 | Chambers | 214/1 BB |

Primary Examiner—Duane A. Reger
Attorney, Agent, or Firm—Teagno & Toddy

[57] ABSTRACT

An improved shuttle assembly for use on a load handling apparatus, the shuttle being of the type which moves between a retracted position and an extended position. The shuttle assembly has a base plate which remains stationary and includes a gear train in driving engagement with a rack on the underside of a driver plate to move the driver plate longitudinally relative to the base plate. The driver plate includes at least one gear which rotates in a normally horizontal plane and engages a rack which remains fixed relative to the base plate, so that the gear rotates in response to longitudinal movement of the driver plate. Adjacent the periphery of the gear is a roller or a cam follower which drivingly engages a channel attached to the underside of an intermediate member, thus causing the intermediate member to move relative to the driver plate at a velocity which is generally sinusoidal. A load supporting top plate is driven at a sinusoidal velocity twice that of the intermediate member by means of a chain drive having one end attached to the base plate, the other end attached to the top plate, and passing around a sprocket attached to the intermediate member. The load supporting top plate is therefore able to move between the retracted position and the extended position at a substantially greater average velocity, requiring only a simple, one-speed input, and the preferred sinusoidal velocity improves the load control capability because the load moves slowly at the beginning and end of the travel.

10 Claims, 8 Drawing Figures

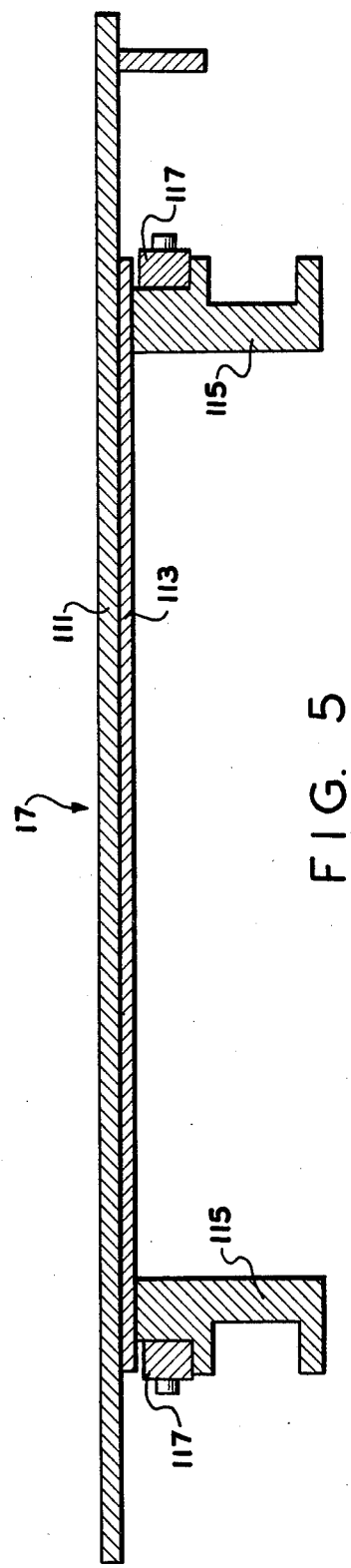

SHUTTLE ASSEMBLY FOR A LOAD HANDLING APPARATUS

BACKGROUND OF THE DISCLOSURE

The present invention relates to a shuttle assembly usable on a load handling apparatus, such as a stacker crane, and more particularly, to a shuttle assembly having an increased average velocity of movement between the retracted position and the extended position. Although it will be apparent that the present invention is adaptable to many types of load handling apparatus, it is especially advantageous when used with a device such as an automated stacker crane, for which the fastest possible operating cycle is desirable: therefore, the invention will be described in connection with such a stacker crane.

Stacker cranes are commonly used in automated warehouses to put material into the desired bin or storage loction and/or to retrieve material from its storage bin. Typically, a stacker crane moves along the warehouse aisle with the shuttle assembly in the retracted position, and when the crane reaches the designated storage loction, the shuttle assembly either to the left or to the right to deposit or to retrieve the load.

A stacker crane of the type presently known in the art is illustrated in U.S. Pat. No. 3,596,789, assigned to the assignee of the present invention. The illustrated crane utilizes a shuttle assembly which includes a stationary base section, an intermediate section longitudinally movable relative to the base section and a load supporting section longitudinally movable relative to the intermediate section. The term "longitudinal," as used hereinafter in reference to the motion of the various sections of a shuttle assembly, shall mean a direction toward or away from a bin or storage location, i.e., normally perpendicular to the warehouse aisle.

Presently, commercially available shuttle assemblies operate at a substantially constant velocity over most of the travel of the load supporting plate, this constant velocity typically being about 60 ft./min. (18.2 meters per minute). The main drive for the shuttle is provided by a two-speed gear motor, with acceleration and deceleration at the beginning and end of the travel being accomplished by the low speed winding, while the high speed winding provides the constant velocity movement. Attempts at increasing this travel velocity have not been satisfactory, partly because of problems related to the positioning and centering of the shuttle, and partly because of the required acceleration and deceleration of the load supporting plate.

SUMMARY OF THE INVENTION

Accordingly, it is an object of the present invention to provide a shuttle assembly for load handling apparatus having a substantially increased travel velocity between the retracted and extended positions over that which is feasible in prior art shuttle assemblies.

It is a related object of the present invention to provide a shuttle assembly which smoothly goes from a low velocity to a high velocity and again to a low velocity in response to a constant speed input, without the need for a low speed winding.

It is another object of the present invention to provide a shuttle assembly in which constant speed longitudinal movement of one section of the shuttle results in relative movement of the load supporting section of the shuttle at a velocity which is generally sinusoidal.

The above and other objects of the present invention, which will become apparent upon a reading of the following detailed description, are accomplished by the provision of an improved shuttle assembly operable between a retracted position and an extended position in response to an input drive. The shuttle assembly comprises a base assembly including a drive gear which is rotated by the input drive. A drive assembly is operatively associated with the drive gear to move longitudinally relative to the base assembly in response to rotation of the drive gear. The drive assembly includes gear means which rotates in response to longitudinal movement of the drive assembly, such as by engagement with a rack fixed relative to the base assembly. An intermediate assembly is longitudinally movable relative to the drive assembly and means are provided for interconnecting the gear means on the drive assembly and the intermediate assembly to cause the intermediate assembly to move relative to the drive assembly at a generally sinusoidal velocity in response to rotation of the gear means. A load supporting assembly is longitudinally movable relative to the intermediate assembly and means is provided for interconnecting the intermediate assembly and a load supporting assembly which transmits the relative sinusoidal velocity of the intermediate assembly, at a first average velocity, into motion of the load supporting assembly at a second average velocity. The second average velocity is at least equal to the first average velocity and, preferably, is approximately twice the first average velocity, i.e., about 120 ft./min. (36.4 meters per minute), compared to 60 ft./min. (18.2 meters per minute).

BRIEF DESCRIPTION OF THE DRAWINGS

FIG. 5 is a transverse cross section, similar to FIG. 1, of the load supporting top plate of the shuttle assembly.

DESCRIPTION OF THE PREFERRED EMBODIMENT

Figure 1:
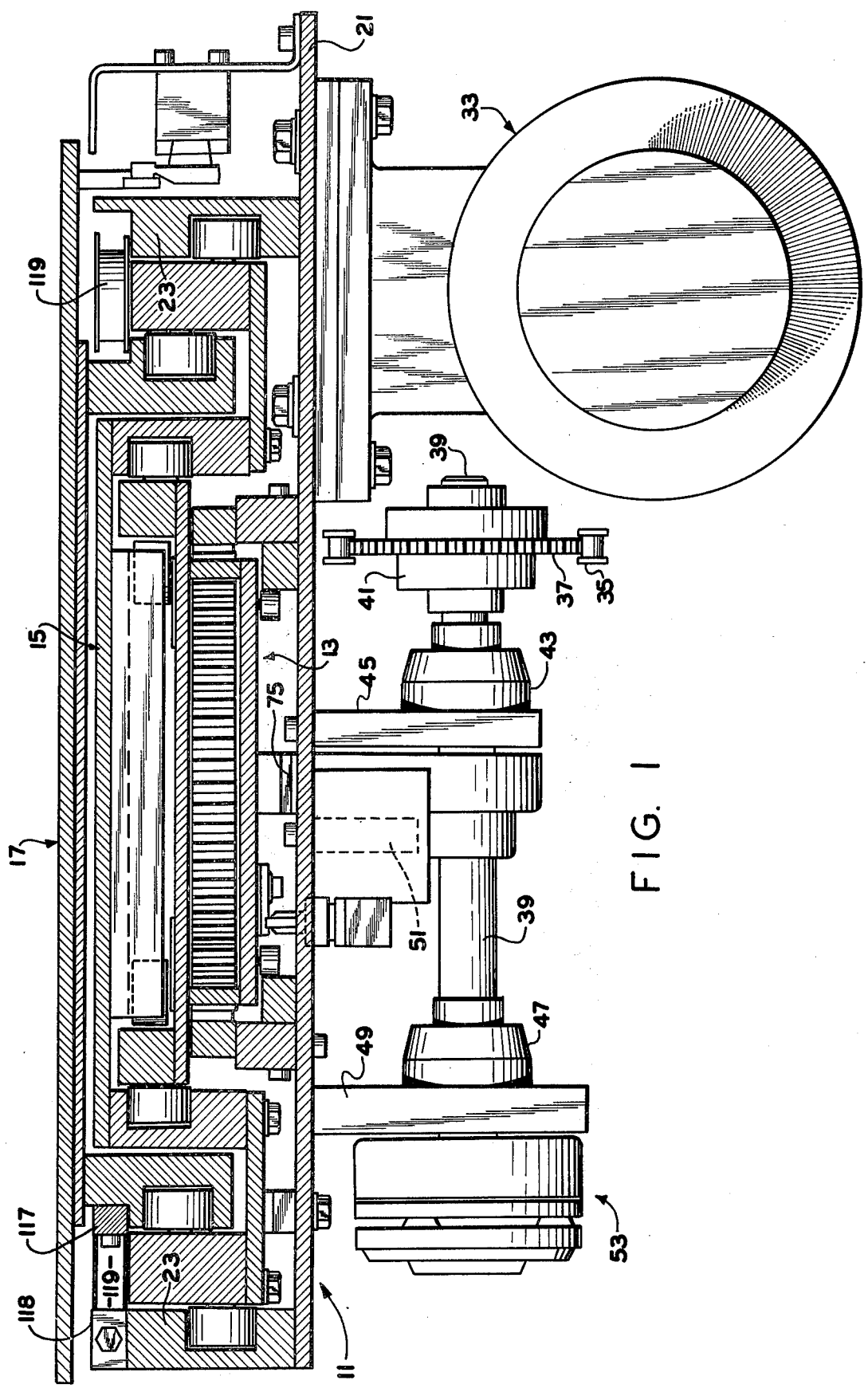
FIG. 1 is a transverse cross section of a shuttle assembly made in accordance with the present invention, the term "transverse" as used hereinafter meaning perpendicular to the longitudinal axis of the shuttle assembly.

Referring now to the drawings, which are for the purpose of illustrating a preferred embodiment, of the invention and not for limiting the same, FIG. 1 is a transverse cross section of a shuttle assembly made in accordance with the present invention. As was stated previously, the shuttle assembly of the present invention may be utilized with a stacker crane such as that illustrated in U.S. Pat. No. 3,596,789, which is incorporated herein by reference. When used with such a stacker crane, the shuttle assembly of the present invention would be positioned, and would function, in generally the same manner, relative to the remainder of the stacker crane, as would the shuttle assembly illustrated and described in the cited patent.

Referring again to FIG. 1, the shuttle assembly includes a base plate sub-assembly 11, a driver plate sub-assembly 13, an intermediate member sub-assembly 15 and a top plate sub-assembly 17.

Figure 2:
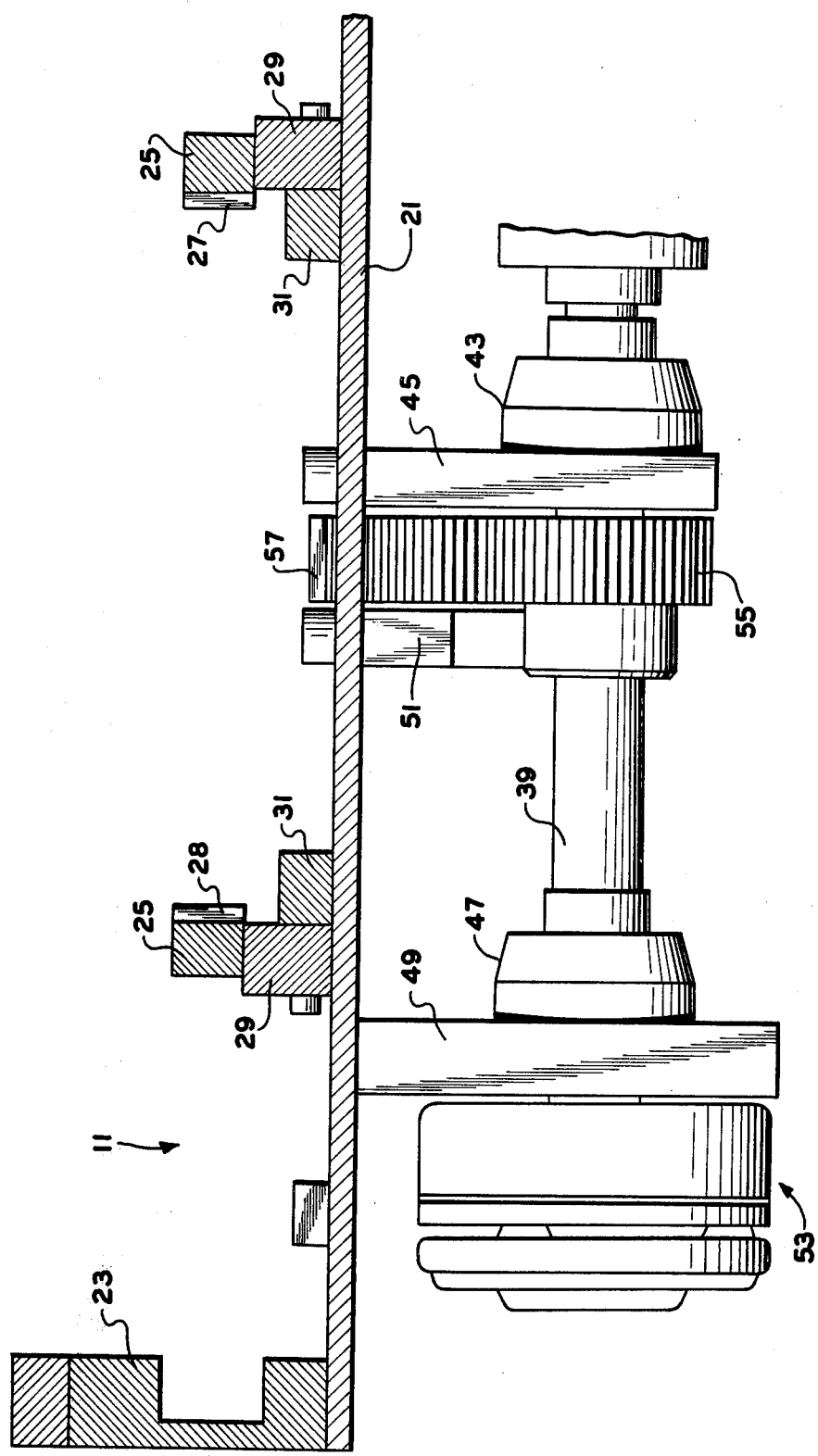
FIG. 2 is fragmentary, transverse cross section, similar to FIG. 1, of the base plate of the shuttle assembly.

Referring now to FIG. 2, in conjunction with FIG. 1, the base plate sub-assembly 11, shown fragmentarily in FIG. 2, includes a base plate 21 on the upper surface of which is mounted a pair of channel-shaped side rails 23, only the left side rail 23 being shown in FIG. 2. It will be appreciated that the side rails 23 extend longitudinally of the shuttle assembly and are substantially parallel. Disposed inwardly from the side rails 23 is a pair of longitudinally extending rail assemblies 25, each of which includes a toothed rack (one being designated by the numeral 27 and the other by the numeral 28). Each toothed rack is mounted on top of a rack support rail 29, and disposed inwardly therefrom is a driver plate guide rail 31.

Referring again to FIG. 1, mounted on the underside of base plate 21 is a motor assembly 33, which provides a constant, one-speed drive, by means of a drive chain 35, to a driver sprocket 37 is mounted on a drive shaft 39, in association with a torque limiter 41.

The drive shaft 39 is supported by a pillow block bearing 43 mounted on a right-hand gear support rail 45, and also by a pillow block bearing 47 mounted on brake mounting bracket 49. Both the gear support rail 45 and the brake mounting bracket 49 are bolted to the underside of the base plate 21, as is a left-hand gear support rail 51. Also attached to the drive shaft 39, at the left end thereof, is a magnetic brake 53.

As may best be seen in FIG. 2, a drive gear 55 is mounted on the drive shaft 39, the drive gear 55 being in meshing engagement to provide input drive to a gear cluster including a pair of gears 57 (only one of which is seen in FIG. 2), and disposed in meshing engagement between the gears 57 is an idler gear (not shown in FIG. 2). Each of the gears 57, as well as the idler gear is mounted rotatably on a stub shaft 59, which are not visible in FIG. 2, but one of which is visible in the longitudinal cross section of FIG. 7 which will be referred to subsequently. Each of the gears 57 protrudes upwardly through an elongated, centrally disposed clearance slot 61 which is defined by the base plate 21, a portion of which is visible in FIG. 7.

Figure 3:
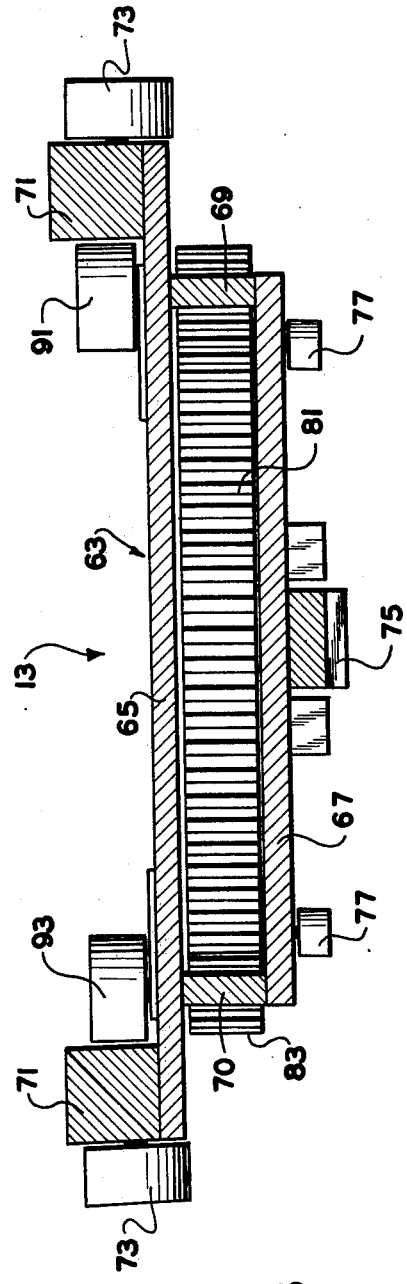
FIG. 3 is a transverse cross section, similar to FIG. 1, of the driver plate of the shuttle assembly.
Figure 7:
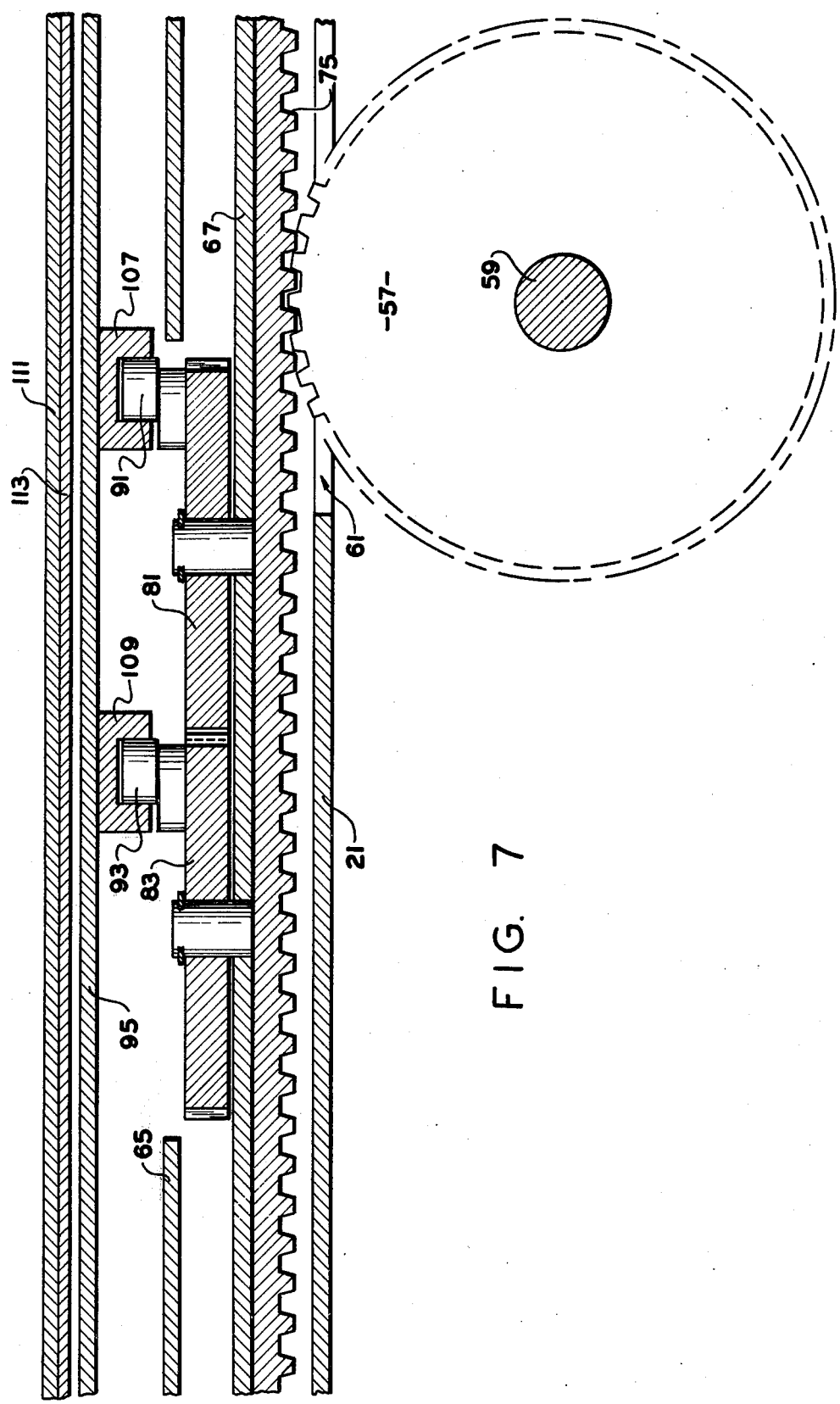
FIG. 7 is a longitudinal cross section through the shuttle assembly of the present invention, after one-fourth of its total travel.

Referring now to FIG. 3, the driver plate sub-assembly 13 includes a welded box frame assembly 63 including an upper plate 65, a lower plate 67 and a pair of side plates 69 and 70. Mounted on the upper surface of upper plate 65 is a pair of longitudinally extending support bars 71, each of which has four cam rollers 73 rotatably mounted thereon. Mounted on the underside of the lower plate 67 is a gear rack 75 which, as may be seen in FIG. 7, is in meshing engagement with each of the gears 57. Also attached to the underside of lower plate 67 are two rows of cam rollers 77, each row of cam rollers 77 engaging one of the drive plate guide rails 31 to cooperatively insure proper alignment of the driver plate sub-assembly 13 relative to the base plate sub-assembly 11.

Figure 6:
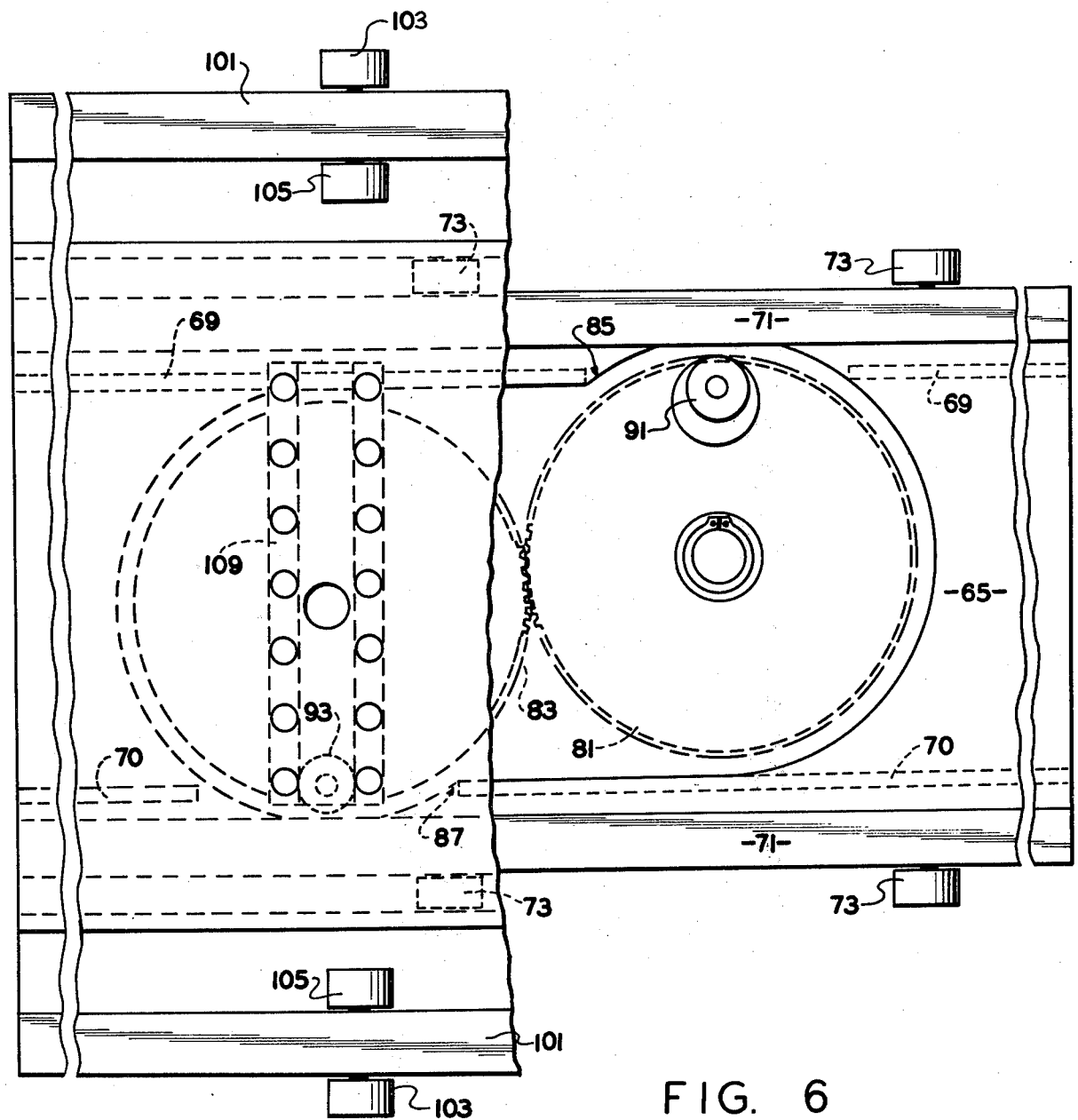
FIG. 6 is a plan view of the shuttle assembly of the present invention, partly broken away, and with the top plate removed.

Rotatably disposed within the box frame assembly 63 is a pair of spur gear members 81 and 83 which, as may be seen by viewing FIG. 6, have their respective axes of rotation oppositely disposed about a central longitudinal axis. Because of this offset arrangement the gear member 81 projects laterally through an opening 85 in side plate 69 (see FIG. 6) and the gear member 83 projects through an opening 87 in the side plate 70. Gear member 81 is in meshed engagement with toothed rack 27 while gear member 83 is in meshed engagement with toothed rack 28, such that longitudinal movement of the driver plate sub-assembly 13 relative to the base plate sub-assembly 11 causes rotation of gear members 81 and 83 which, preferably, are in toothed engagement with each other.

Rotatably mounted on the upper surface of gear member 81 is a cam follower 91, and similarly mounted on the upper surface of gear member 83 is a cam follower 93, the function of the cam followers 91 and 93 being described in greater detail subsequently.

Figure 4:
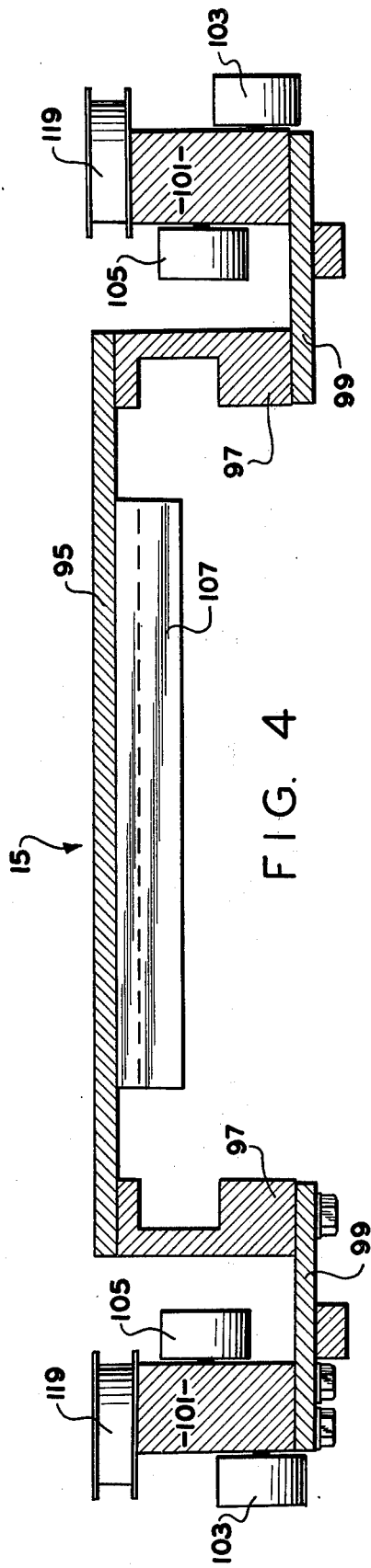
FIG. 4 is a transverse cross section, similar to FIG. 1, of the intermediate member of the shuttle assembly.

Referring now to FIG. 4, the intermediate member sub-assembly 15 includes an intermediates plate 95, and welded to the underside of the plate 95 is a pair of channel-shaped guide rails 97, disposed to receive the cam rollers 73 of the driver plate sub-assembly 13. It will be noted by comparing FIGS. 3 and 4 that, for ease of illustration, the intermediate member sub-assembly 15 of FIG. 4 is shown on a smaller scale than the driver plate sub-assembly 14. Bolted to the underside of each of the guide rails 97 is a tie plate 99, and on the upper surface of each tie plate 99 is bolted a roller support rail 101. On each of the support rails 101 a series of outer cam rollers 103 are rotatably mounted, and are in rolling engagement with the side rails 23 of the base plate sub-assembly 11 to permit smooth longitudinal rolling of the intermediate member sub-assembly 15 relative to the base plate sub-assembly 11. Also rotatably mounted on each of the support rails 101 is a series of inner cam rollers 105, the function of which will be described subsequently.

Bolted to the underside of the intermediate plate 95 is a pair of cam channels 107 and 109 (only one of which is shown in FIG. 4). As may be seen in FIGS. 6 and 7, cam follower 91 is received by cam channel 107, and cam follower 93 is received by cam channel 109, such that longitudinal movement of cam follows 91 and 93, caused by rotation of gear members 81 and 83, will result in longitudinal movement of the intermediate member sub-assembly 15 relative to the driver plate sub-assembly 13.

Referring now to FIG. 5, there is shown the top plate sub-assembly 17 on a slightly smaller scale than the intermediate member sub-assembly 15 is shown in FIG. 4. The top plate sub-assembly 17 includes a load-supporting plate 111 and a sub-plate 113 which is included to add rigidity to the sub-assembly. Bolted to the underside of the sub-plate 13 is a pair of channel-shaped roller guide rails 115, each of which is positioned to receive the respective series of inner cam rollers 105 of the intermediate member sub-assembly 15. The engagement of the cam rollers 105 within the guide rails 115 permits smooth longitudinal rolling of the top plate sub-assembly 17 relative to the intermediate member sub-assembly 15 and also insures proper lateral alignment therebetween. Disposed on the outer surface of each of the roller guide rails 115 is a chain anchor block 117, to which is attached one end of a drive chain (not shown) which has its other end attached to a chain adjustment block 118 on the base plate sub-assembly 11 (see FIG. 1). Between blocks 117 and 118, the chain passes around an idler sprocket 119 rotatably mounted on the upper surface of roller support rail 101 of the intermediate member sub-assembly 15.

It should be apparent that on the left side of the shuttle assembly in FIG. 1, the chain blocks 117 and 118 are at one end of the assembly and the idler sprocket 119 is at the opposite end to translate movement of sub-assembly 15 into the drawing into movement of sub-assembly 17 in the same direction. On the right side of the shuttle in FIG. 1, the relative positions of the chain blocks and the sprocket are reversed from the arrangement on the left side, so that movement of sub-assembly 15 out of the drawing will be translated into movement of sub-assembly 17, also in a direction out of the drawing.

OPERATION

Figure 8:
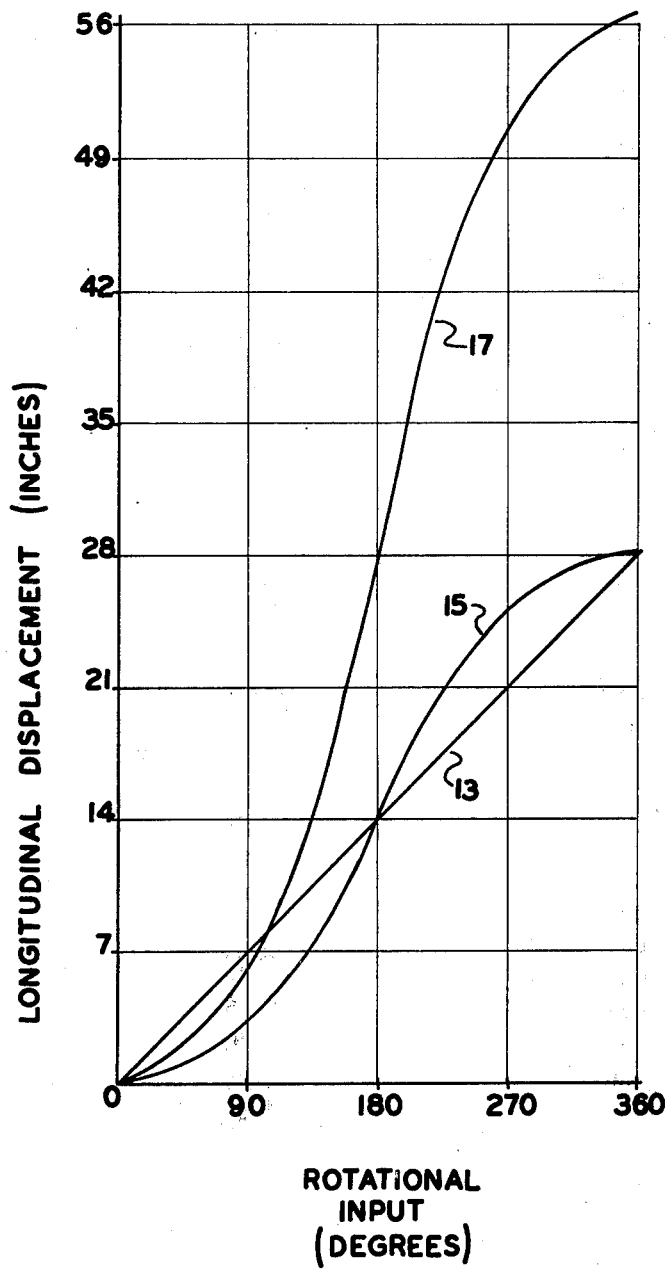
FIG. 8 is a graph of displacement versus input for each of the movable sections of the shuttle assembly.

In order to best understand the operation of the shuttle assembly of the present invention, the following description should be read in conjunction with the previously-described figures, as well as the graph of FIG. 8, illustrating the longitudinal displacement of each of the previously described sub-assemblies as a function of the rotational displacement of the input, i.e., the spur gear members 81 and 83. It will be appreciated that on the graph of FIG. 8, there is no slot shown for the base plate sub-assembly 11 which remains stationary, and thus, the displacements are relative to the base plate sub-assembly 11. It will further be appreciated that because the graph of FIG. 8 is, in effect, displacement versus time, the instantaneous slope of each of the curves represents the velocity of that sub-assembly at that point in time.

The constant rotational input drive of motor assembly 33 is transmitted in the manner described above to drive gear 55 (FIG. 2), which in turn, transmits the input torque to gears 57 as well as the idler gear in meshing engagement therebetween. The gears 57 are in driving engagement with gear rack 75 such that the linear velocity of the gears 57 is translated into longitudinal velocity of the driver plate sub-assembly 13, the velocity of sub-assembly 13 being constant as is represented in FIG. 8 by the straight-line displacement curve.

Referring now to FIG. 6, there is shown what corresponds to the 0° position on the graph of FIG. 8. As input drive is transmitted to the gear rack 75 by the gears 57, tending to move the driver plate sub-assembly 13 to the left in FIG. 6, spur gear 81, in engagement with toothed rack 27, rotates clockwise, while spur gear 83, in engagement with toothed rack 28, rotates counterclockwise. It will be seen that as these respective rotations of spur gears 81 and 83 occur, the cam followers 91 and 93 begin to move to the right relative to the remainder of the driver plate sub-assembly 13. Because the displacement and velocity of the intermediate member sub-assembly 15 is determined by the engagement of the cam followers 91 and 93 within the cam channels 107 and 109, respectively, the intermediate member sub-assembly 15 initially lags behind relative to the driver plate sub-assembly 13. Note that between 0° and 180° on the graph of FIG. 8, the curve for the intermediate member sub-assembly 15 is below that for the driver plate sub-assembly 13.

Referring now to FIG. 7, it will be seen that the view is taken after 90° of rotation from the starting position by the spur gears 81 and 83, at which time, the cam followers 91 and 93 both lie generally along the longitudinal axis of the shuttle assembly and thus, may be seen in the position shown in FIG. 7.

It will be understood from viewing FIG. 6 in conjunction with the graph of FIG. 8 that the maximum velocity of the intermediate member sub-assembly 15 is achieved at the 180° position of the spur gears 81 and 83, at which time, the cam followers 91 and 93 are each displaced by 180° from the positions shown in FIG. 6, such that the linear velocity of each is toward the left relative to the remainder of the driver plate sub-assembly 13.

As the spur gears 81 and 83 rotate through the final 180° of input, the cam followers 91 and 93 return to the initial positions shown in FIG. 6. Thus, it will be apparent that the total longitudinal displacement of the sub-assemblies 13 and 15 is identical, with the only difference being the instantaneous velocities at any given time.

As was described above, the movement of the intermediate member sub-assembly 15 at a particular instantaneous velocity is translated into movement of the top plate sub-assembly 17 at an instantaneous velocity which is substantially twice that of the sub-assembly 15. This is accomplished by means of the two drive chain arrangements (one for each direction of movement), each including a chain having one end anchored to the base plate sub-assembly 11 and the other end anchored to the top plate sub-assembly 17 and intermediate its two ends, passing around the idler sprocket 119 mounted on sub-assembly 15, so that movement of the sub-assembly 15 pulls the sub-assembly 17 at double the velocity of the sub-assembly 15.

Thus, in the subject embodiment, the sub-assemblies 15 and 17 each move at a velocity which varies sinusoidally, the top plate sub-assembly 17 attaining a maximum velocity of about 240 ft./min. (72.8 meters per minute) at the 180° input position. It will be understood that the sinusoidal velocity, with the relatively slower speed at the beginning and end of the travel, overcomes the problems associated with prior art shuttle assemblies for which higher velocities such as 120 ft./min. (36.4 meters per minute) were attempted.

Although the present invention has been described as utilizing cam channels 107 and 109 which provide planer cam surfaces and a sinusoidal velocity of sub-assembly 15, it should be apparent that the configuration of the cam channels may be modified to change the shape of the velocity curve for particular applications.

I claim:
1. A shuttle assembly for use on a load handling apparatus, and being operable to move longitudinally between a retracted position and an extended position in response to an input drive, said shuttle assembly comprising:
   a. a base assembly including a drive means operable to be actuated by said input drive,
   b. a drive assembly operatively associated with said drive means to move longitudinally in at least one direction relative to said base assembly in response to actuation of said drive means;
   c. said drive assembly including second drive means operable in response to longitudinal movement of said drive assembly;
   d. an intermediate assembly longitudinally movable relative to said drive assembly;
   e. means interconnecting said second drive means and said intermediate assembly operable to impart harmonic motion to said intermediate assembly to cause said intermediate assembly to move relative to said drive assembly at a variable velocity in response to movement of said second drive means;

f. a load supporting assembly longitudinally movable in said one direction relative to said intermediate assembly; and g. means connecting said intermediate assembly and said load supporting assembly and operable to transmit motion of said intermediate assembly, at a first average velocity, into motion of said load supporting assembly at a second average velocity, said second average velocity being at least equal to said first average velocity.

2. A shuttle assembly as claimed in claim 1 wherein said second drive means comprises a toothed member oriented longitudinally of said base assembly and fixed relative thereto, and a gear member rotatably mounted on said drive assembly and in toothed engagement with said toothed member.

3. A shuttle assembly for use on load handling apparatus, and being operable to move longitudinally between a retracted position and an extended position in response to an input drive, said shuttle assembly comprising:

a. a base assembly including a drive means operble to be actuated by said input drive;

b. a drive assembly operatively associated with said drive means to move longitudinally in at least one direction relative to said base assembly in response to actuation of said drive means;

c. said drive assembly including second drive means operable in response to longitudinal movement of said drive assembly, said second drive means comprising a toothed member oriented longitudinally of said base assembly and fixed relative thereto, and a gear member rotatably mounted on said drive assembly and in toothed engagement with said toothed member;

d. an intermediate assembly longitudinally movable relative to said drive assembly;

e. means interconnecting said second drive means and said intermediate assembly comprising a cam member attached to said intermediate assembly, said cam member defining a cam surface oriented generally perpendicular to the longitudinal axis, and a cam follower mounted on said gear member, said cam follower engaging said cam surface to provide movement of said intermediate assembly relative to said drive assembly at a velocity which varies sinusoidally.

f. a load supporting assembly longitudinally movable in said one direction relative to said intermediate assembly; and g. means connecting said intermediate assembly and said load supporting assembly and operable to transmit motion of said intermediate assembly, at a first average velocity, into motion of said load supporting assembly at a second average velocity, said second average velocity being at least equal to said first average velocity.

4. A shuttle assembly operable to move between a retracted position and an extended position at a velocity which varies sinusoidally from a minimum to a maximum and back to said minimum, said shuttle assembly comprising:

a. a base assembly;

b. a drive assembly longitudinally movable in at least one direction relative to said base assembly;

c. drive means for providing said relative longitudinal movement of said drive assembly;

d. a first gear rack oriented longitudinally of said base assembly and fixed relative thereto;

e. said drive assembly including a first gear member in meshing engagement with said first gear rack to cause rotation of said first gear member, in response to said relative longitudinal movement of said drive assembly, at a surface velocity substantially equal to the linear velocity of said drive assembly;

f. load supporting means longitudinally movable in said one direction relative to said drive assembly;

g. first means interconnecting said load supporting means and said first gear member at a first pivot point on said gear member, transversely spaced from the axis of rotation of said first gear member, said pivot point and the axis of rotation of said first gear member defining a first line at substantially a 90° angle with the longitudinal axis of said drive assembly when said shuttle assembly is in said retracted position; and h. said shuttle assembly moving from said retracted position to said extended position during substantially one revolution of said first gear member.

5. A shuttle assembly as claimed in claim 4 wherein said interconnecting means comprises a cam follower mounted on said first gear member at said pivot point, and said load supporting means includes a cam surface oriented to be engaged by said cam follower during substantially the entire rotation of said first gear member.

6. A shuttle assembly as claimed in claim 5 wherein said cam surface is substantially planar and is oriented generally perpendicular to the longitudinal axis of said drive assembly and said load supporting means.

7. A shuttle assembly as claimed in claim 4 including a second gear rack oriented generally parallel to said first gear rack, and fixed relative thereto, said drive assembly including a second gear member in meshing engagement with said second gear rack and second means interconnecting said load supporting means and said second gear member at a second pivot point on said second gear member transversely spaced from the axis of rotation of said second gear member, said second pivot point and said axis of rotation of said second gear member defining a second line at substantially a 90° angle with the longitudinal axis of said drive assembly when said shuttle assembly is in said retracted position, said second line being oppositely disposed about the longitudinal axis from said first line.

8. A shuttle assembly as claimed in claim 4 wherein said load supporting means comprises an intermediate assembly longitudinally movable relative to said drive assembly and driven by said first gear member, at a sinusoidal velocity, through said first interconnecting means, said load supporting means further comprising a top plate longitudinally movable relative to said intermediate assembly and means for converting the sinusoidal velocity of said intermediate assembly into a sinusoidal velocity of said top plate having a maximum velocity substantially twice the maximum velocity of said intermediate assembly.

9. A shuttle assembly adapted for handling a load, said shuttle assembly being movable longitudinally between a retracted position and an extend position in response to an input drive, and comprising:

a. a base assembly including longitudinally oriented gear means;

b. a drive assembly including drive means operable to transmit the input drive into longitudinal movement of said drive assembly relative to said base assembly;

c. said drive assembly further including a rotatable gear member in meshing engagement with said longitudinally oriented gear means, said gear member rotating during said longitudinal movement of said drive assembly relative to said base assembly;

d. load supporting means longitudinally movable relative to said drive assembly; and e. means interconnecting said load supporting means and said gear member to transmit rotation of said gear member into said relative longitudinal movement of said load supporting means, said relative movement occurring at a velocity which varies from a minimum velocity to a maximum velocity at substantially the midpoint of said relative longitudinal movement and back to approximately said minimum velocity during movement of the shuttle assembly from the retracted position to the extended position.

10. A shuttle assembly as claimed in claim 9 wherein said drive means comprises a toothed member fixed relative to said drive assembly and a gear train fixed relative to said base assembly, said gear train including a drive gear in meshing engagement with said toothed member.

* * * * *

UNITED STATES PATENT AND TRADEMARK OFFICE
CERTIFICATE OF CORRECTION

PATENT NO. : 4,016,984
DATED : April 12, 1977
INVENTOR(S) : George R. Pipes

It is certified that error appears in the above-identified patent and that said Letters Patent are hereby corrected as shown below:

| | |
|---|---|
| Col. 1, line 20: | "location" is misspelled. |
| line 24: | "location" is misspelled and after "assembly" insert ---extends---. |
| line 55: | "a" has been omitted after "for" |
| line 65: | "a" has been omitted before "constant". |
| Col. 3, line 25: | After "37" insert a period (.), and "The driver sprocket 37" has been omitted before ---is mounted etc---. |
| Col. 4, line 24: | "14" should be "13". |

Signed and Sealed this twelfth Day of July 1977

[SEAL]

Attest:

RUTH C. MASON
Attesting Officer

C. MARSHALL DANN
Commissioner of Patents and Trademarks